US012296336B2

(12) United States Patent
Haupt et al.

(10) Patent No.: US 12,296,336 B2
(45) Date of Patent: May 13, 2025

(54) FLUIDIC PERISTALTIC LAYER PUMP

(71) Applicant: Remus Brix Anders Haupt

(72) Inventors: Remus Brix Anders Haupt, Encinitas, CA (US); John Harald Holm Arvidsen, Oelstykke (DK)

(73) Assignee: Remus Brix Anders Haupt, San Diego, CA (US)

( * ) Notice: Subject to any disclaimer, the term of this patent is extended or adjusted under 35 U.S.C. 154(b) by 749 days.

(21) Appl. No.: 17/425,578

(22) PCT Filed: Jan. 24, 2020

(86) PCT No.: PCT/US2020/015090
§ 371 (c)(1),
(2) Date: Jul. 23, 2021

(87) PCT Pub. No.: WO2020/154689
PCT Pub. Date: Jul. 30, 2020

(65) Prior Publication Data

US 2022/0097041 A1 Mar. 31, 2022

Related U.S. Application Data

(60) Provisional application No. 62/796,470, filed on Jan. 24, 2019.

(51) Int. Cl.
*B01L 3/00* (2006.01)

(52) U.S. Cl.
CPC ..... *B01L 3/50273* (2013.01); *B01L 2200/025* (2013.01); *B01L 2200/027* (2013.01); *B01L 2200/143* (2013.01); *B01L 2300/023* (2013.01); *B01L 2300/123* (2013.01); *B01L 2400/0481* (2013.01)

(58) Field of Classification Search
CPC .......... B01L 3/50273; B01L 2200/025; B01L 2200/027; B01L 2200/143; B01L 2300/023; B01L 2300/123; B01L 2400/0481; F04B 43/12; F04B 19/006
See application file for complete search history.

(56) References Cited

U.S. PATENT DOCUMENTS

2008/0015494 A1* 1/2008 Santini, Jr. ........ A61M 5/14248 604/65
2010/0288382 A1* 11/2010 Levent .................... F04B 43/14 137/565.26

FOREIGN PATENT DOCUMENTS

WO WO-2017189735 A1 * 11/2017 .......... B01L 3/50273

OTHER PUBLICATIONS

Neerincx et al. ("A fully {Polymeric Mouldable Microfluidic Device. Part 1: The process of Design," Macromol. Mater. Eng. 2011, 296, 1081-1090) (Year: 2011).*

* cited by examiner

*Primary Examiner* — Jill A Warden
*Assistant Examiner* — Michael Stanley Gzybowski
(74) *Attorney, Agent, or Firm* — Raymond Wagenknecht; Biotech Beach Law PC

(57) ABSTRACT

A microfluidic device is provided for managing fluid flow in disposable infusion devices, thereby providing periodic or constant flow of fluid even at very low doses and/or flow rates. Pumps utilizing the microfluidic device, as well as methods for manufacture and performing a microfluidic process are also provided.

17 Claims, 6 Drawing Sheets

FLUIDIC PERISTALTIC LAYER PUMP

CROSS REFERENCE TO RELATED APPLICATION(S)

This application claims the benefit of priority under 35 U.S.C. § 119(e) of US Ser. No. 62/796,470, filed Jan. 24, 2019, the entire content of which is incorporated herein by reference.

BACKGROUND OF THE INVENTION

Field of the Invention

The invention relates to fluidics technology, and more particularly to a multilayer peristaltic pump for control of fluid flow through microchannels.

Background Information

Microfluidics systems are of significant value for acquiring and analyzing chemical and biological information using very small volumes of liquid. Use of microfluidic systems can increase the response time of reactions, minimize sample volume, and lower reagent and consumables consumption. When volatile or hazardous materials are used or generated, performing reactions in microfluidic volumes also enhances safety and reduces disposal quantities.

Microfluidic devices have become increasingly important in a wide variety of fields from medical diagnostics and analytical chemistry to genomic and proteomic analysis. They may also be useful in therapeutic contexts, such as mobile low flow rate drug delivery/infusion systems and continuous monitoring systems for animal drug models. For example, a micropump may be used for periodic or continuous administration of fluid to a subject in need thereof or may be used to monitor efficacy of an administered drug over time by taking periodic samples.

However, the micro-components required for these devices are often complex and costly to produce. Thus, a need exists for a low-cost microfluidic device that integrates with a motor to form a micropump for integration into, for example, a mobile infusion device.

SUMMARY OF THE INVENTION

A microfluidic pump has been developed in order to provide low cost, high accuracy means for disposable infusion devices and fluidic sampling/monitoring devices. Devices utilizing the microfluidic pump, as well as methods for manufacture and performing a microfluidic process are also provided.

Accordingly, in one aspect, the invention provides a microfluidic device. The microfluidic device includes an annular body having a top surface, a bottom surface, an inner surface defining an aperture, and a substantially concave wall extending downward from the bottom surface to a base, the annular body comprising an input port and an output port disposed therein; an elastic collar fixedly attached to the bottom surface of the annular body, the elastic collar comprising a flange disposed around the periphery thereof and a bottom surface fixedly attached to the base of the annular body, wherein the flange is configured to be mated to the bottom surface of the annular body; and a rigid substrate having a top surface, a bottom surface, and a tapered extension extending downward from the bottom surface, the rigid substrate comprising an inlet and an outlet disposed in the top surface and positioned in alignment with input port and output port of the annular body, wherein the bottom surface of the rigid substrate is fixedly attached to the top surface of the annular body and the tapered extension is sized and shaped to fit within the aperture, thereby forming a channel with the elastic collar between the input port and the output port. In various embodiments, the annular body is bonded to the rigid substrate. In various embodiments, the microfluidic device may further include an inlet connector and an outlet connector disposed on the top surface of the rigid substrate, each being respectively provided in fluid communication with the inlet port and outlet port of the annular body.

The elastic collar of the microfluidic device may include one or more detents formed in an inner surface thereof, each decent being respectively in fluid communication with the inlet and the outlet of the rigid substrate, in various embodiments, an inner surface of the elastic collar is concave to further define the channel. In various embodiments, the flange of the elastic collar is bonded to the bottom surface of the annular body and wherein the bottom surface of the tapered extension of the rigid substrate is bonded to the inner surface of the base. In various embodiments, the tapered extension of the rigid substrate comprises a groove disposed in a surface thereof, the groove being positioned parallel to the top surface of the rigid substrate, wherein the groove is configured to be mated with the elastic collar.

In various embodiments, the elastic collar further comprises a rib disposed along a circumference thereof, the rib being positioned substantially parallel to the flange. In various embodiments, the rigid substrate further comprises an extension extending away from an axis thereof, the extension having disposed therein a microfluidic channel configured to provide fluid communication between the outlet port of the annular body and the outlet of the rigid substrate.

In yet another aspect, the invention provides a pump that includes the microfluidic device as herein described; a rotary actuator removably attached to the base of the microfluidic device, the rawly actuator configured to compress a portion of the elastic collar of the microfluidic device; and a motor coupled to the rotary actuator and configured to rotate the rotary actuator around the periphery of the microfluidic device. In various embodiments, the rotary actuator includes a body having an aperture disposed therein, the aperture being sized and shaped to accept the base and rigid collar of the microfluidic device; and one or more balls fixedly attached to an inner surface of the aperture of the body, the one or more balls being configured to compress a portion of the elastic collar as the rotary actuator rotates. Each of the one or more balls is fixedly attached to the inner surface of the aperture of the rotary actuator by a spring, thereby providing positive engagement between the rotary actuator and the microfluidic device.

In various embodiments, the pump includes reservoir in fluid communication with an inlet connector of the microfluidic device, the reservoir being configured to: (i) contain a fluid to be delivered by the pump or (ii) accept a fluid to be sampled by the pump. In various embodiments, the pump includes a needle in fluid communication with an outlet connector of the microfluidic device, the needle being configured to: (i) administer fluid from the reservoir into a subject in need thereof or (ii) obtain a sample from a subject. In various embodiments, the pump also includes a controller and a power supply, wherein the controller configured to supply voltage from the power supply to the motor to rotate the rotary actuator. In various embodiments, the controller may also be configured to communicate with a hand-held device regarding information selected from the group consisting of amount of fluid being dispensed, time of dispensing, duration of dispensing, amount of fluid remaining in the reservoir, time of sampling, duration of sampling, and amount of volume remaining in the reservoir for further sampling.

DETAILED DESCRIPTION OF THE INVENTION

A microfluidic pump and device containing the pump have been developed in order to provide low cost, high accuracy, and low flow rate means for disposable infusion devices. Advantageously, the rate of fluid flow within the pump is essentially constant even at very low flow rates.

Before the present compositions and methods are described, it is to be understood that this invention is not limited to particular compositions, methods, and experimental conditions described, as such compositions, methods, and conditions may vary. It is also to be understood that the terminology used herein is for purposes of describing particular embodiments only, and is not intended to be limiting, since the scope of the present invention will be limited only in the appended claims.

As used in this specification and the appended claims, the singular forms "a", "an", and "the" include plural references unless the context clearly dictates otherwise. Thus, for example, references to "the method" includes one or more methods, and/or steps of the type described herein which will become apparent to those persons skilled in the art upon reading this disclosure and so forth.

The term "comprising," which is used interchangeably with "including," "containing," or "characterized by," is inclusive or open-ended language and does not exclude additional, unrecited elements or method steps. The phrase "consisting of" excludes any element, step, or ingredient not specified in the claim. The phrase "consisting essentially of" limits the scope of a claim to the specified materials or steps and those that do not materially affect the basic and novel characteristics of the claimed invention. The present disclosure contemplates embodiments of the invention devices and methods corresponding to the scope of each of these phrases. Thus, a device or method comprising recited elements or steps contemplates particular embodiments in which the device or method consists essentially of or consists of those elements or steps.

Unless defined otherwise, all technical and scientific terms used herein have the same meaning as commonly understood by one of ordinary skill in the art to which this invention belongs. Although any methods and materials similar or equivalent to those described herein can be used in the practice or testing of the invention, the preferred methods and materials are now described.

Figure 1:
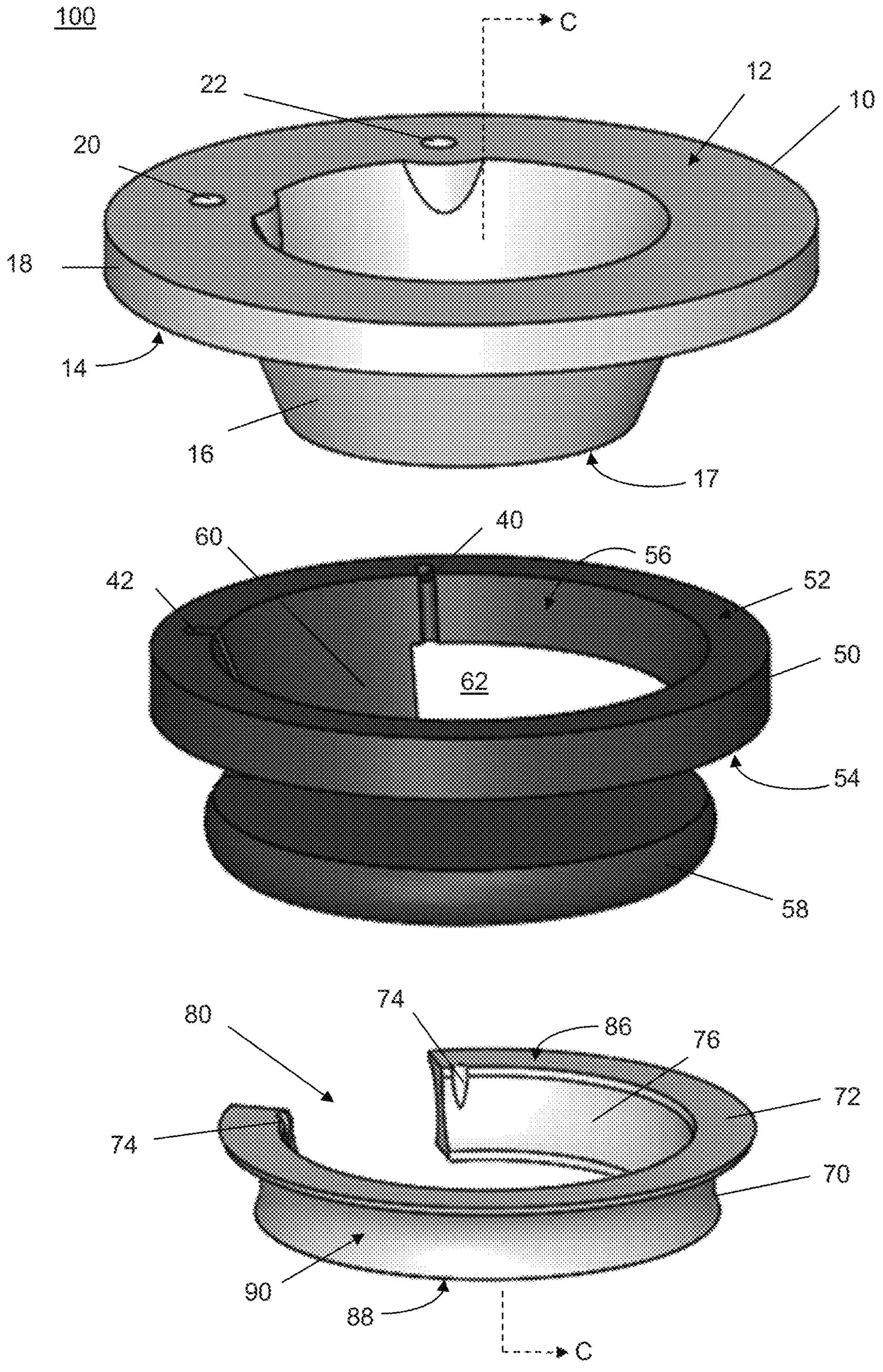
FIG. 1 is a pictorial diagram showing an exemplary embodiment of the components of the microfluidic device.
Figure 2:
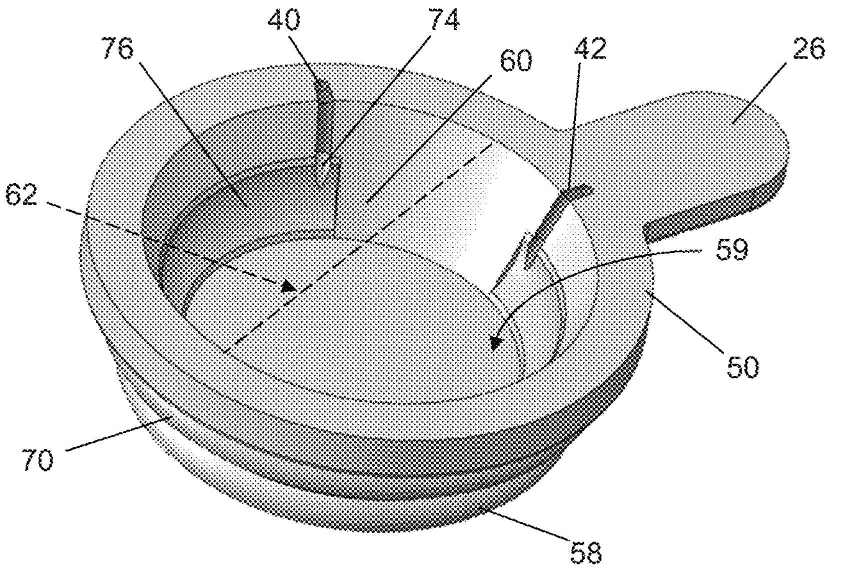
FIG. 2 is a pictorial diagram showing a perspective view of an exemplary embodiment of the elastic collar attached to the annular body of the microfluidic device.
Figure 3:
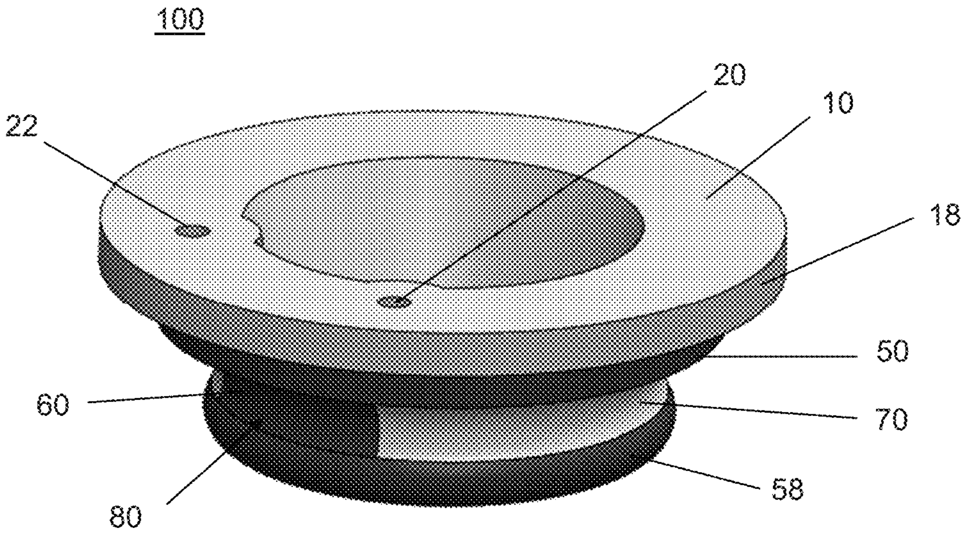
FIG. 3 is a pictorial diagram showing a perspective view of an exemplary embodiment of the microfluidic device.

With reference now to FIGS. 1-7, the invention provides a microfluidic device 100 for use in conjunction with a rotary actuator 110 to form a microfluidic pump 200. The microfluidic device 100 includes an annular body 50 having a top surface 52, a bottom surface 54, and an inner surface 56 defining an aperture 62. Disposed within the annular body 50 are one or more input ports 40 and output ports 42. In various embodiments, the one or more input ports 40 and output ports 42 are disposed along the width (i.e., substantially parallel to axis C) of the annular body 50 to provide fluid communication between the top surface 52 and the bottom surface 54 of the annular body 50. It should be understood that while FIGS. 1 and 2 show each of the input port 40 and output port 42 in cross-sectional format for explanatory purposes only, the input port 40 and output port 42 extend through the annular body 50. Extending from the bottom surface 54 of the annular body 50 is a base 58. In various embodiments, base 58 is connected to the bottom surface 54 of the annular body 50 by a substantially concave wall 60 running around a portion of the periphery of the annular body 50, leaving a space between the base 58 and the bottom surface 54 around a majority of the periphery of the annular body 50. Annular body 50 may be formed from any non-elastic material such as, but not limited to, metal, plastic, non-elastic polymers, silicon (such as crystalline silicon), or glass. In various embodiments, the material from which the annular body 50 is formed is biologically inert and amenable to known sterilization techniques.

The microfluidic device 100 further includes an elastic collar 70 that is sized and shaped to be fixedly attached to the annular body 50, thereby filling the space between the base 58 and the bottom surface 54 thereof. Elastic collar 70 may include a top surface 86, a bottom surface 88, and a substantially concave wall 90 (i.e., protruding inward toward axis C) extending downward from the top surface 86. The concave wall 90 may substantially mirror the curvature of the concave wall 60 of the annular body 50. In various embodiments, elastic collar 70 may include a flange 72 disposed around the periphery thereof, the flange 72 extending away from the axis C. The flange 72 may be sized and shaped to contact the bottom surface 54 of the annular body 50. In various embodiments, flange 72 may include one or more inlet/outlet detents 74 formed in the inner surface 76 thereof, wherein each of the inlet/outlet detents 74 are disposed in alignment with and in fluid communication with the one or more input ports 40 and output ports 42 of the annular body 50 when mated thereto.

Figure 4:
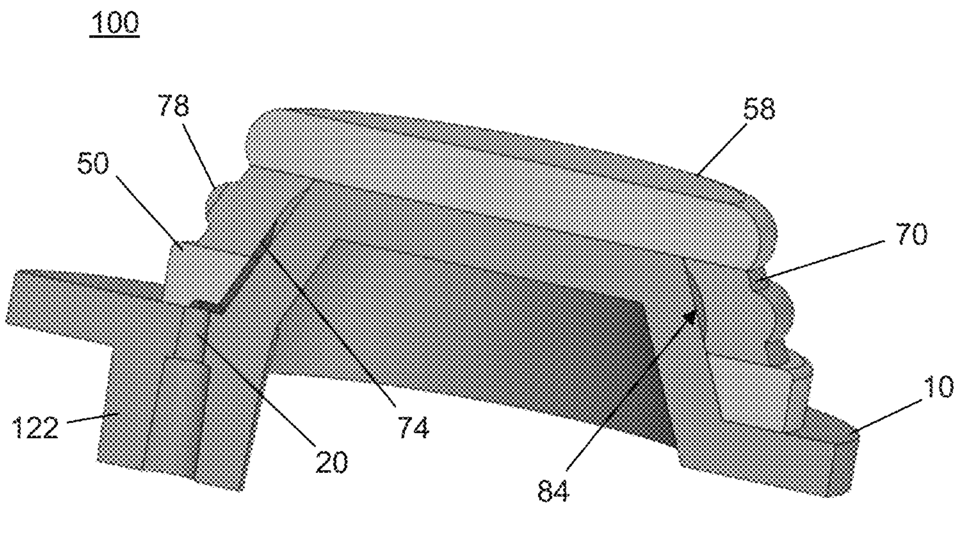
FIG. 4 is a pictorial diagram showing a cross-sectional view of an exemplary embodiment of the microfluidic device showing the input port.
Figure 5:
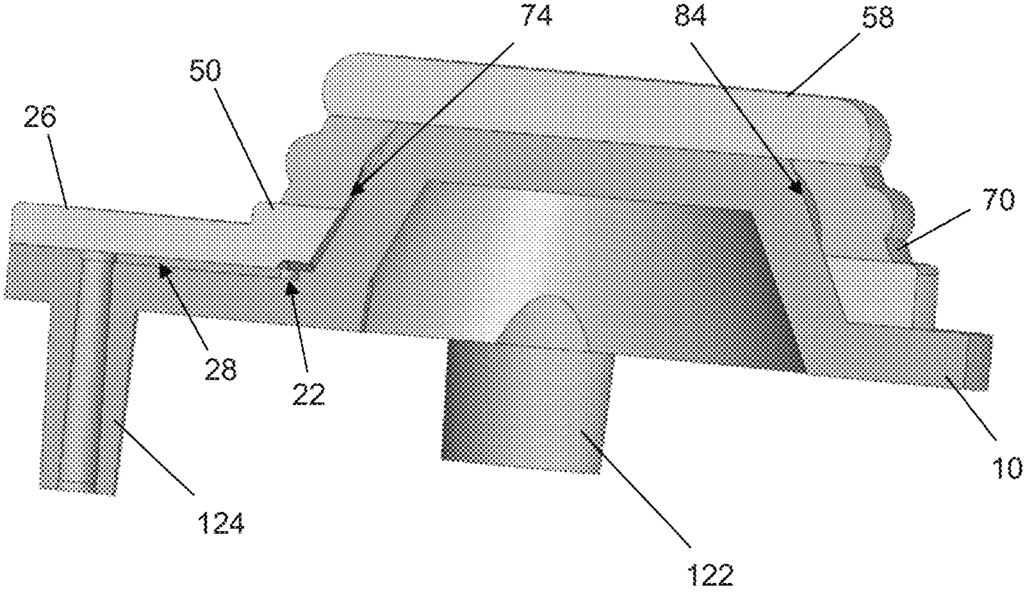
FIG. 5 is a pictorial diagram showing a cross-sectional view of an exemplary embodiment of the microfluidic device showing the output port.
Figure 6:
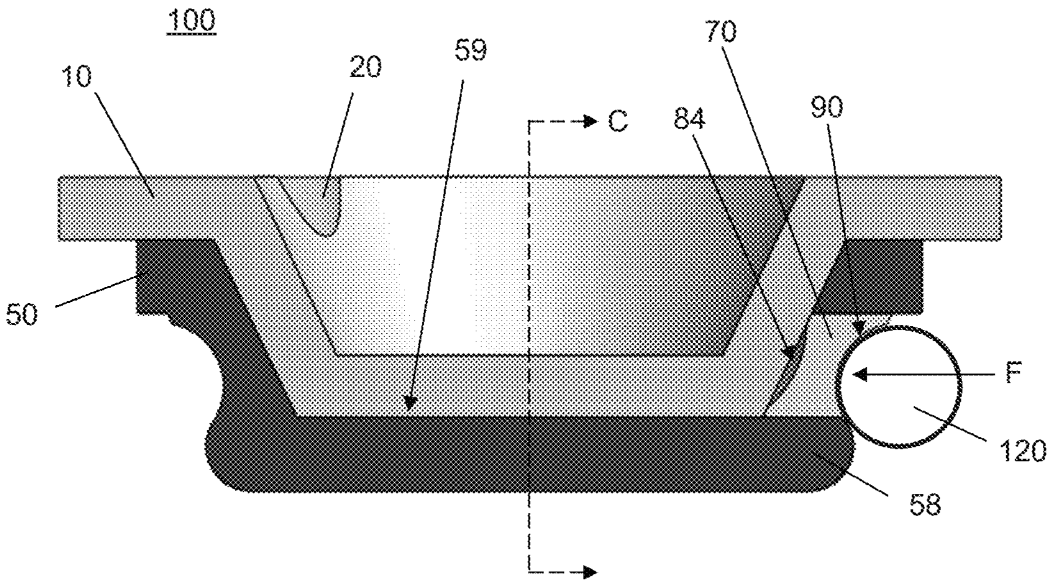
FIG. 6 is a pictorial diagram showing a cross-sectional view of an exemplary embodiment of the microfluidic device.
Figure 7:
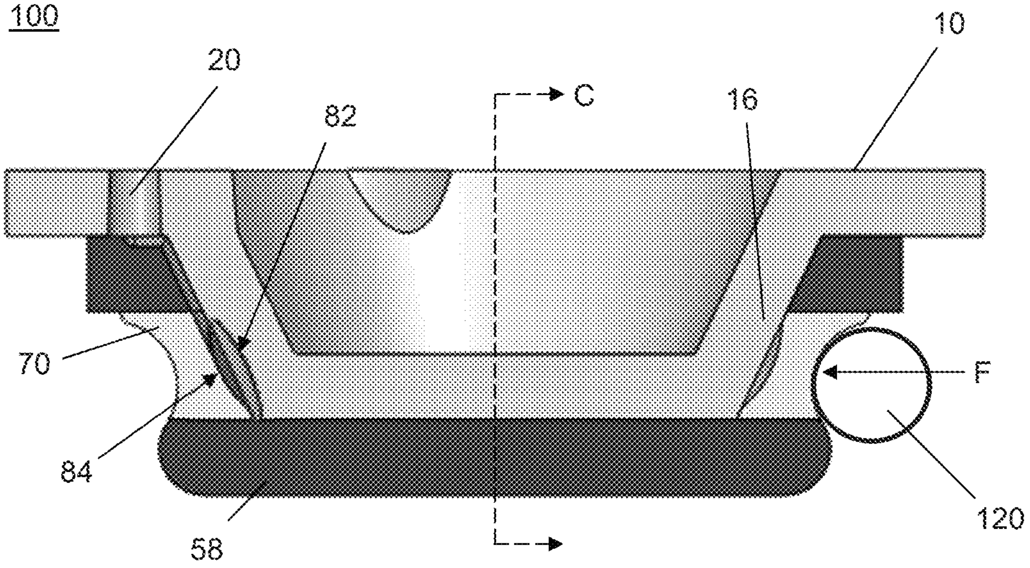
FIG. 7 is a pictorial diagram showing another cross-sectional view of an exemplary embodiment of the microfluidic device.

Elastic collar 70 may further include a gap 80, such that elastic collar 70 is not a continuous ring. The gap 80 exposes a portion of the concave wall 60 of annular body 50 that separates the input port 40 and output port 42. As shown in FIGS. 4 and 5, concave wall 90 of the elastic collar 70 may further include a rib 78 disposed along its circumference, the rib 78 being positioned substantially parallel to the flange 72. The rib 78 provides an increased cross-sectional thickness of the elastic collar 70 to increase the compressive strength and engagement of a rotary actuator 110 (see FIG. 8). One skilled in the art would understand that the rib 78 may be formed in any of a number of suitable shapes such as a continuous raised element (as shown) or a series of bumps (not shown). In various embodiment, elastic collar 70 may be formed from any deformable and/or compressible material, such as, for example, rubber or an elastomer. In various embodiments, elastic collar 70 is formed from thermoplastic elastomers.

As one of skill in the art would understand, annular body 50 and elastic collar 70 may be formed as individual components, or the components may be joined using a process of two-shot molding or overmolding, in which case first one polymer and then the other is injected into a mold tool to form a singular piece. A variety of techniques may be utilized to fixedly attach the annular body 50 to the elastic collar 70, where the flange 72 of the elastic collar 70 is fixedly attached to the bottom surface 54 of annular body 50 and the bottom surface 88 of the elastic collar 70 is fixedly attached to the base 58 of the annular body 50.

For example, the parts may be joined together using UV curable adhesive or other adhesives that permit for movement of the two parts relative one another prior to curing of the adhesive/creation of bond. Suitable adhesives include a UV curable adhesive, a heat-cured adhesive, a pressure sensitive adhesive, an oxygen sensitive adhesive, and a double-sided tape adhesive. Alternatively, the parts may be coupled utilizing a welding process, such as, an ultrasonic welding process, a thermal welding process, a laser welding process, and/or a torsional welding process. One of skill in the art will readily appreciate that elastomeric and non-elastomeric polymers can be joined in this way to achieve fluid tight seals between the parts.

Disposed within annular body 50 is a substantially rigid substrate 10 having a top surface 12 and a bottom surface 14, with a tapered extension 16 extending from the bottom surface 14. As such, a bottom surface 17 of the tapered extension 16 seats on the inner surface 59 of base 58 of the annular body 50, while the top surface 52 of the annular body 50 abuts to and is attached to the bottom surface 14 of the rigid substrate 10. Thus, the rigid substrate 10 forms a flange 18 covering the annular body 50 such that the top surface 52 of the annular body 50 is mated to the bottom surface 14 of the rigid substrate 10. In other words, tapered extension 16 of the substantially rigid body 10 is sized and shaped to fit within the aperture 62 of the annular body 50. In various embodiments, the rigid substrate may include an extension 26 extending in a direction away from axis C. Disposed within the extension 26 may be a microfluidic channel 28 configured to provide fluid communication between the outlet 22 of the rigid substrate and the output port 42 of the annular body 50.

Accordingly, the inner surface 76 of the elastic collar 70 forms a fluid-tight channel 84 with the tapered extension 16 of the rigid substrate 10, where the channel 84 provides fluid communication between the input port 40 and output port 42 of the annular body 50 via detents 74 of the elastic collar 70. In various embodiments, the inner surface 76 of the elastic collar 70 may be substantially concave (i.e., protruding away from axis C), thereby further defining the channel 84 between the rigid substrate 10 and the elastic collar 70. In various embodiments, the tapered extension 16 of rigid substrate 10 may include a groove 82 formed in a portion thereof, wherein the groove 82 extends around the periphery thereof and is positioned substantially parallel to the top surface 52 of the annular base 50. When so provided, the groove 82 serves to further increase the volume capacity of channel 84.

Disposed in the upper surface 12 of the rigid substrate 10 may be an inlet 20 and an outlet 22, both of which may be positioned in alignment with, and therefore in fluid communication with, the one or more input ports 40 and output ports 42 of the annular body when rigid substrate 10 and the annular body 50 are attached to each other. As with the annular body 50, rigid substrate 10 may be formed from any non-elastic material such as, but not limited to, metal, plastic, non-elastic polymers, silicon (such as crystalline silicon), or glass. In various embodiments, rigid substrate 10 is formed from the same material as that of the annular body 50 to reduce overall manufacturing costs.

Thus, in this configuration, the microfluidic device 100 relies upon forces directed toward the axis C to actuate pumping action. Likewise, the configuration provides the added advantage of reducing manufacturing costs and facilitating assembly thereof. When a force F (see FIGS. 6 and 7), provided for example via a deformation element, such as a ball 120 of a rotary actuator 110, is applied to the elastic collar 70 and/or to the concave wall 60 of the annular body 50, at least a portion of the concave wall 90 of the elastic collar 70 is compressed into the channel 84 formed between elastic collar 70 and rigid substrate 10, thereby occluding at least a portion of the channel 84 at the site of compression to displace a portion of fluid within channel 84. As the rotary actuator 110 rotates, the site of compression translates along concave wall 90, resulting in peristaltic fluid flow within channel 84 in the direction of rotation.

In various embodiments, concave wall 90 occludes, in the compressed state, at least about 50%, at least about 75%, at least about 90%, at least about 95%, at least about 97.5%, at least about 99%, or essentially all of the uncompressed cross-sectional area of the channel 84 at the site of compression. The compression may create a fluid-tight seal between the elastic collar 70 and the tapered extension 16 of the rigid substrate within the channel 84 at the site of compression. When a fluid-tight seal is formed, fluid, e.g., a liquid or gas, is prevented from passing along the channel 84 from one side of the site of compression to the other side of the site of compression. The fluid-tight seal may be transient, e.g., the elastic collar 70 may fully or partially relax upon removal of the compression, thereby fully or partially reopening channel 84. The channel 84 may have a first cross-sectional area in an uncompressed state and a second cross-sectional area in the compressed state. For example, a ratio of the cross-sectional area at the site of compression in the compressed state to the cross-sectional area at the same site in the uncompressed state may be at least about 0.75, at least about 0.85, at least about 0.925, at least about 0.975, or about 1. One skilled in the art would appreciate that the surfaces of the channel 84 formed in the microfluidic device 100 may be modified, for example, by varying hydrophobicity. For instance, hydrophobicity may be modified by application of hydrophilic materials such as surface-active agents, application of hydrophobic materials, construction from materials having the desired hydrophobicity, ionizing surfaces with energetic beams, and/or the like.

A variety of methods may be utilized to fixedly attach the annular body 50 to the rigid substrate 10. For example, the parts may be joined together using UV curable adhesive or other adhesives that permit for movement of the two parts relative one another prior to curing of the adhesive/creation of bond. Suitable adhesives include a UV curable adhesive, a heat-cured adhesive, a pressure sensitive adhesive, an oxygen sensitive adhesive, and a double-sided tape adhesive. Alternatively, the parts may be coupled utilizing a welding process, such as, an ultrasonic welding process, a thermal welding process, and a torsional welding process. In a further alternative, the parts may be joined using a process of two-shot molding or overmolding, in which case first one polymer and then the other is injected into a mold tool to form a singular piece. One of skill in the art will readily appreciate that elastomeric and non-elastomeric polymers can be joined in this way to achieve fluid tight seals between the parts.

Figure 8:
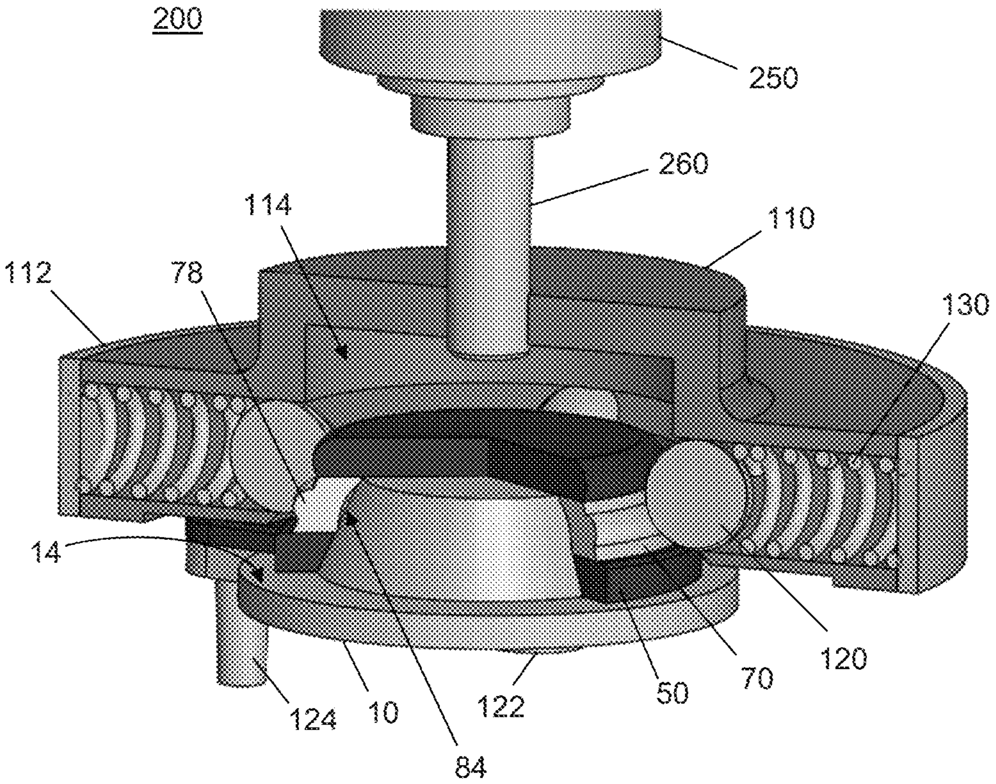
FIG. 8 is a pictorial diagram showing a partial cross-sectional view of an exemplary embodiment of the microfluidic device mounted with an actuator and a motor to form an exemplary embodiment of a pump.
Figure 9:
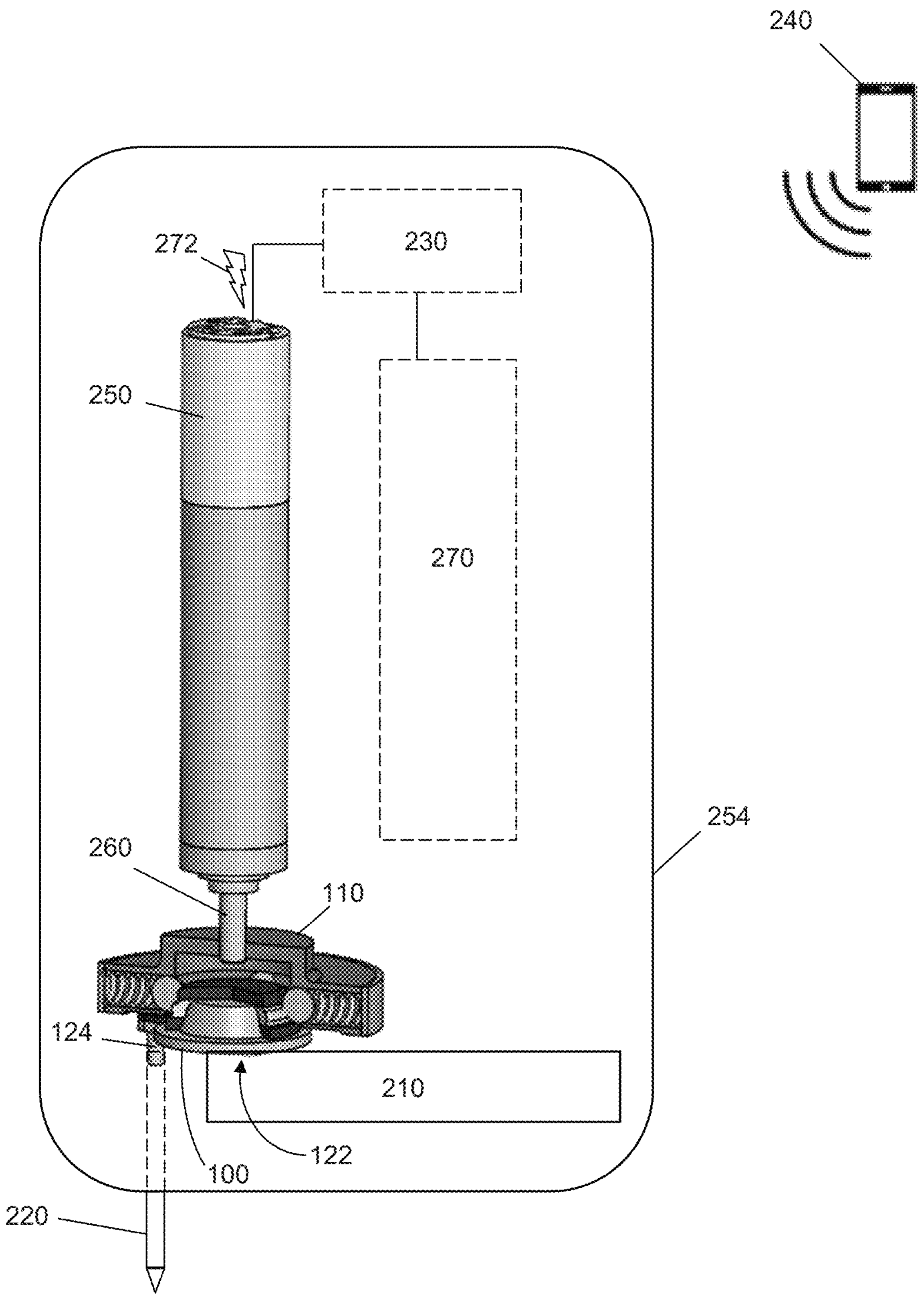
FIG. 9 is a pictorial diagram showing another partial cross-sectional view of an exemplary embodiment of the microfluidic device mounted with an actuator and a motor to form an exemplary embodiment of a pump.

Referring now to FIGS. 8-9, in another aspect, a microfluidic pump 200 is provided, which utilizes the microfluidic device 100, described herein. Thus, the microfluidic pump 200 includes a microfluidic device 100 and a rotary actuator 110 that is removably attached to the base 58 of the microfluidic device 100. The rotary actuator 110 includes a body 112 having an aperture 114 disposed there, where the aperture 114 is sized and shaped to accept the annular body 50 and the elastic collar 70 therein. Fixedly attached to an inner surface 116 of the aperture 114 of the body 112 is one or more balls 120 configured to compress a portion of the concave wall 90 of elastic collar 70 as the rotary actuator 110 rotates. In various embodiments, each of the one or more balls 120 may be fixedly attached to a spring 130 disposed within the body 112 to further increase force F applied to the annular elastic body 50 of the microfluidic device 100. When so provided, the springs 130 and balls 120 of the rotary actuator 110 work in conjunction to lock over the base 58 and onto the concave wall 60 and/or the elastic collar 70 of the microfluidic device 100, thereby resulting in positive, removable engagement between the rotary actuator 110 and the microfluidic device 100.

Mechanical rotation of the one or more balls 120 by the rotary actuator 110 results in translation of a site of compression along the elastic collar 70 of the microfluidic device 100, thereby creating an effective pumping action resulting in the flow of fluid within the channel 84 in the direction of rotation of the rotary actuator 110. Thus, the volume to be pumped may be adjusted by varying the number of balls 120 within the rotary actuator 110, with the spacing between each ball 120 being a fixed amount of volume to be pumped. The flow of fluid may then enter and exit through an appropriate inlet connector 122 and outlet connector 124 disposed for formed) on the top surface 12 of the rigid substrate 10, where inlet connector 122 is provided in fluid communication with the inlet 20 and the outlet connector 124 is provided in fluid communication with the outlet 22. As should be understood, inlet connector 122 may be provided in fluid communication with a reservoir 210 containing a fluid to be dispensed, while outlet connector 124 may be provided in fluid communication with tubing or a needle for administration of the fluid to a subject. In various embodiments, inlet connector 122 and outlet connector 124 may be formed as leer locks to provide a fluid-tight fitting.

In various embodiments, mechanical rotation of the rotary actuator 110 may be accomplished by an electric motor 250 coupled to the rotary actuator 110 by a shaft 260. The electric motor 250 and rotary actuator 110 may be provided in a housing 254 together with a power supply 270 and a controller 230, such that the rotary actuator 110 is configured to radially traverse balls 120 along elastic collar 70 of the microfluidic device 100 when the microfluidic device 100 is placed in positive engagement with the rotary actuator 110 and voltage 272 is directed to the electric motor 250. As will be appreciated by those of skill in the art, the rotational direction of the rotary actuator 110 with relation to the microfluidic device 100 dictates the direction of flow within the channel 84. As such, one skilled in the art would appreciate that, advantageously, fluid flow through the pump 200 may be bidirectional. In addition, since the microfluidic device 100 is configured to flow liquids and gases, the flow of gaseous fluid may provide for initial priming liquid fluid within the pump 200.

The rotary actuator 110 may therefore be rotated by applying a voltage 272 from a power source 270, such as a rechargeable battery, to the electric motor 250 controlling movement thereof. As such, the invention further provides a method for performing a microfluidic process which includes applying a voltage 272 to a microfluidic pump 200 as described herein. The applied voltage 272 activates the electric motor 250, which rotates rotary actuator 110 attached thereto, thereby resulting in repeated translation of a site of compression along the elastic collar 70.

A wide range of pulses per second may be applied to the electric motor 250, thereby effectuating a wide range of flow rates within the microfluidic device 100. The fluid flow may be essentially constant, with little or no shear force being imposed on the fluid, even at very low flow rates. These characteristics of the pump 200 enhance the accuracy of the amount of fluid being delivered (e.g., enabling delivering of micro amounts of infusion fluid), while low flow rates provide for consistent delivery without the effects of a bolus amount. As such, a low, constant pumped flow rate can also be very useful to ensure dosing accuracy.

The following exemplary embodiment describes use of a microfluidic pump 200 of the present invention for use in a low cost, disposable device for administering a fluid (e.g., insulin) to a subject. The pump 200 may include a reservoir 210 containing the fluid (e.g., insulin) to be administered to the subject, where the reservoir 210 is in fluid communication with the inlet 122 of the microfluidic device 100. The outlet 124 of the microfluidic device 100 may be connect to tubing (e.g., a catheter) or a needle 220 that is inserted into tissue (i.e., subcutaneous fat or muscle) of the subject. The microfluidic pump 200 may include a controller 230 configured to direct voltage 272 from a power supply 270 to the motor 250, thereby administering a predetermined amount of fluid to the subject at appropriate times of day or, if appropriate, to provide continuous subcutaneous therapy (e.g., insulin therapy). All of the foregoing components of the device (i.e., the microfluidic device 100, the rotary actuator 110, the motor 250, power supply 270, controller 230 and reservoir 210) may be disposed within a single housing 254. Thus, the device may be configured such that the microfluidic device 100 and the reservoir 210 are disposable, such as being provided on a disposable card that is replaced when all or a majority of the fluid within the reservoir 210 has been administered to the subject.

In another exemplary embodiment describing use of the microfluidic pump 200 of the present invention, the microfluidic pump 200 may be used as a low cost, disposable sampling device for drug testing on an animal model of disease. The pump 200 may include a multitude of empty reservoirs 210 configured to contain a sample (e.g., blood) from a subject (e.g., animal model), where each reservoir 210 is in fluid communication with the inlet 122 (which serves as the sample outlet) of the microfluidic device 100. The outlet 124 (serving as the sample inlet) of the microfluidic device 100 may be connected to tubing (e.g., a catheter) or a needle 220 that is inserted into tissue (i.e., subcutaneous fat or muscle) or a vein of the subject. As above, the microfluidic pump 200 may include a controller 230 configured to direct voltage 272 from a power supply 270 to the motor 250 at specific times of the day and/or days of the week, thereby obtaining periodic samples from the subject. Such periodic sampling may, for example, be used to monitor drug efficacy over time within the subject. Likewise, the device may be used to for sampling of gaseous materials for assays requiring small, accurate amounts of sampled gas (e.g., mass spectrometry).

In various embodiments, the controller 230 may be configured for wired or wireless communication with a hand-held device 240, such as a mobile phone or tablet. The wireless communication may be selected from the group consisting of infrared transmission, Bluetooth protocol, radio frequency, Zigbee wireless technology, GPS, WiMAX, and mobile telephony, and may be configured to send/receive information including, but not limited to, amount of fluid (e.g., insulin) being dispensed, time and/duration of dispensing, amount of fluid (e.g., insulin) remaining in the reservoir 210, time of sampling, duration of sampling, amount of volume remaining in the reservoir for further sampling, etc. In various embodiments, the hand-held device 240 may further be configured to monitor one or more physiological characteristics of the subject, such as, but not limited to, blood glucose levels, insulin levels, and temperature of the subject, by means of one or more wireless sensors attached to the subject.

Although the invention has been described with reference to the above disclosure, it will be understood that modifications and variations are encompassed within the spirit and scope of the invention. Accordingly, the invention is limited only by the following claims.

What is claimed is:

1. A microfluidic device comprising:

a) an annular body having a top surface, a bottom surface, an inner surface defining an aperture, and a concave wall extending downward from the bottom surface to a base, the annular body comprising an input port and an output port disposed therein;

b) an elastic collar fixedly attached to the bottom surface of the annular body, the elastic collar comprising a flange disposed around the periphery thereof and a bottom surface fixedly attached to the base of the annular body, wherein the flange is configured to be mated to the bottom surface of the annular body; and c) a rigid substrate having a top surface, a bottom surface fixedly attached to the top surface of the annular body, and a tapered extension positioned within the aperture and extending across the elastic collar to form a channel with the elastic collar that is accessible by the input port and output port and that compresses inward towards the tapered extension, the rigid substrate comprising an inlet and an outlet disposed in the top surface and positioned in alignment with input port and output port of the annular body.

2. The microfluidic device of claim 1, wherein the annular body is bonded to the rigid substrate.

3. The microfluidic device of claim 1, further comprising an inlet connector and an outlet connector disposed on the top surface of the rigid substrate, each being respectively provided in fluid communication with the inlet port and outlet port of the annular body.

4. The microfluidic device of claim 1, wherein the elastic collar comprises one or more detents formed in an inner surface thereof, each detent being respectively in fluid communication with the inlet and the outlet of the rigid substrate.

5. The microfluidic device of claim 1, wherein an inner surface of the elastic collar is concave.

6. The microfluidic device of claim 1, wherein the flange of the elastic collar is bonded to the bottom surface of the annular body and wherein the bottom surface of the tapered extension of the rigid substrate is bonded to an inner surface of the base.

7. The microfluidic device of claim 1, wherein the tapered extension of the rigid substrate comprises a groove disposed in a surface thereof, the groove being positioned parallel to the top surface of the rigid substrate, wherein the groove is configured to be mated with the elastic collar.

8. The microfluidic device of claim 1, wherein the elastic collar further comprises a rib disposed along a circumference thereof, the rib being positioned substantially parallel to the flange and extending outward.

9. The microfluidic device of claim 1, wherein the rigid substrate further comprises an extension extending away from an axis thereof, the extension having disposed therein a microfluidic channel configured to provide fluid communication between the outlet port of the annular body and the outlet of the rigid substrate.

10. A pump comprising:

a) the microfluidic device of claim 1;

b) a rotary actuator removably attached to the base of the microfluidic device, the rotary actuator configured to compress a portion of the elastic collar of the microfluidic device inward; and c) a motor coupled to the rotary actuator and configured to rotate the rotary actuator around the periphery of the microfluidic device.

11. The pump of claim 10, wherein the rotary actuator comprises:

a) a body having an aperture disposed therein, the aperture being sized and shaped to accept the base and elastic collar of the microfluidic device; and b) one or more balls fixedly attached to an inner surface of the aperture of the body, the one or more balls being configured to compress a portion of the elastic collar inward as the rotary actuator rotates.

12. The pump of claim 11, wherein each of the one or more balls is fixedly attached to the inner surface of the aperture of the rotary actuator by a spring, thereby providing positive engagement between the rotary actuator and the microfluidic device.

13. The pump of claim 10, further comprising a reservoir in fluid communication with an inlet connector of the microfluidic device, the reservoir being configured to: (i) contain a fluid to be delivered by the pump or (ii) accept a fluid to be sampled by the pump.

14. The pump of claim 13, wherein the fluid is a liquid or a gas.

15. The pump of claim 13, further comprising a needle in fluid communication with an outlet connector of the microfluidic device, the needle being configured to: (i) administer fluid from the reservoir into a subject in need thereof or (ii) obtain a sample from a subject.

16. The pump of claim 15, further comprising a controller and a power supply, wherein the controller is configured to supply voltage from the power supply to the motor to rotate the rotary actuator.

17. The pump of claim 16, wherein the controller is further configured to communicate with a hand-held device regarding information selected from the group consisting of amount of fluid being dispensed, time of dispensing, duration of dispensing, amount of fluid remaining in the reservoir, time of sampling, duration of sampling, and amount of volume remaining in the reservoir for further sampling.

* * * * *